June 30, 1970   W. H. CORBETT   3,518,409
ELECTRIC STEAM VAPORIZER FOR THERAPEUTIC USE
Original Filed Oct. 23, 1965
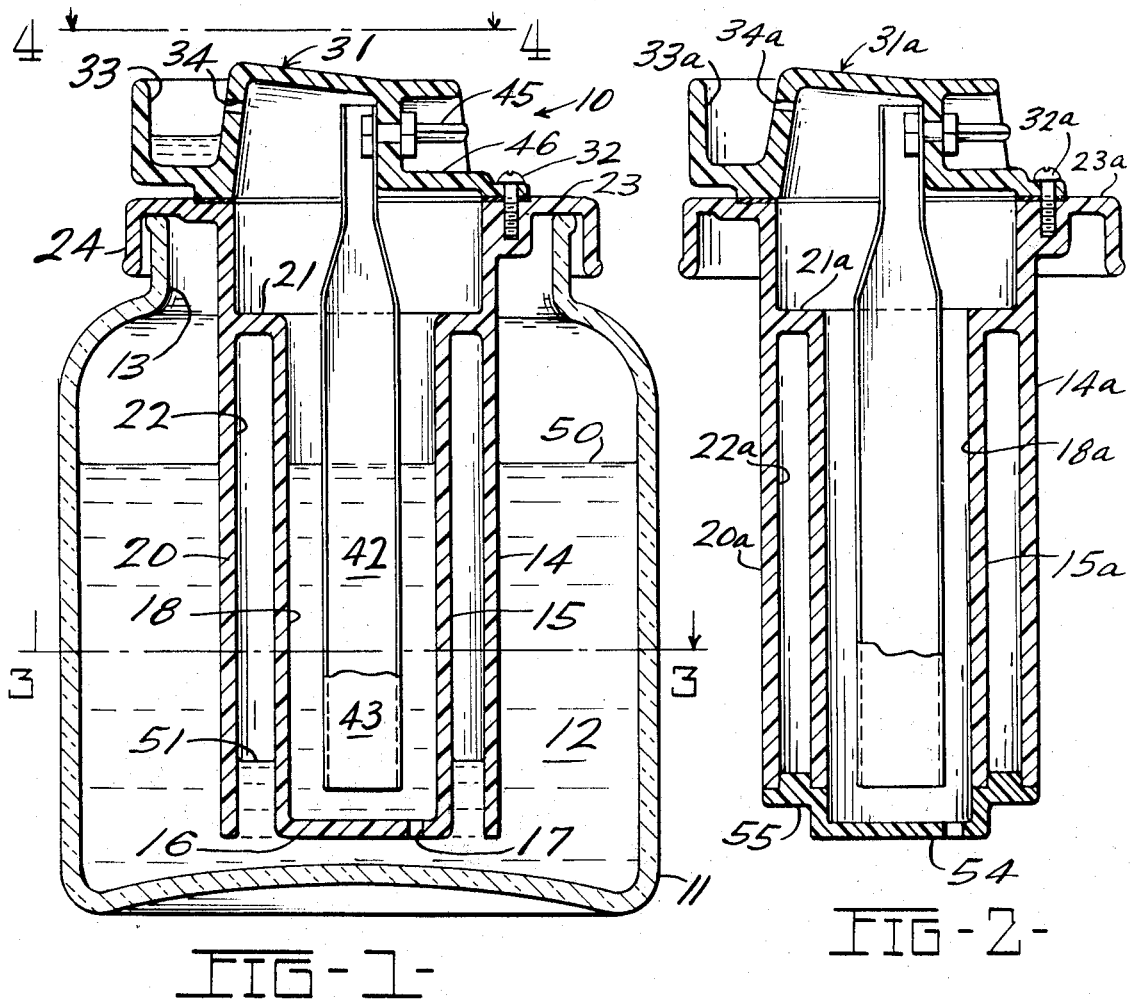
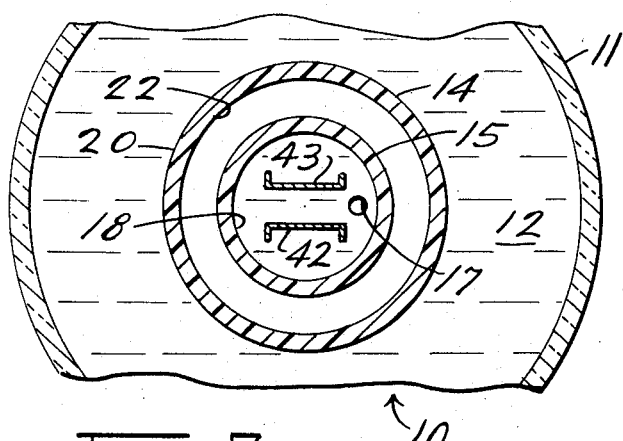
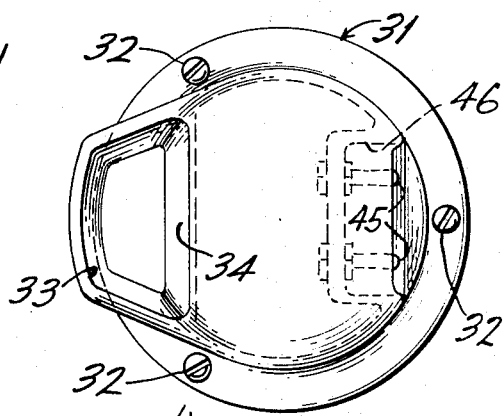
INVENTOR:
WILLIAM H. CORBETT.
BY
ATT'YS.

United States Patent Office 3,518,409
Patented June 30, 1970

3,518,409
ELECTRIC STEAM VAPORIZER FOR
THERAPEUTIC USE
William H. Corbett, Somerset, Pa., assignor to The
De Vilbiss Company, Toledo, Ohio, a corporation
of Ohio
Continuation of application Ser. No. 503,353, Oct. 23,
1965. This application May 1, 1969, Ser. No. 821,157
Int. Cl. H05b 3/60
U.S. Cl. 219—271                                        3 Claims

ABSTRACT OF THE DISCLOSURE

An electric steam vaporizer for therapeutic use having a water receptacle with an electrode housing positioned within the receptacle. The electrode housing has a continuous inner wall which defines a boiling chamber. An impervious skirt is spaced from the inner wall and an impervious top wall connects the skirt and the inner wall to define an open bottomed insulating chamber. A cover having depending spaced electrodes extending into the boiling chamber is mounted on the electrode housing. In a further embodiment, the open bottom of the insulating chambers is closed by an end cap attached to the skirt and inner wall.

This is a continuation of application Ser. No. 503,353, filed Oct. 23, 1965, now abandoned.

This invention relates to an electrically heated steam vaporizer for therapeutic use, and more particularly, to a novel insulated boiling chamber for an electric steam vaporizer.

Steam vaporizers of the general type contemplated by the present invention are adapted to provide a steam vapor alone or in combination with a vaporized medicament. Such vaporizers are used in sick rooms to relieve colds, bronchitis, and other respiratory ailments. Often, such vaporizers are used in the home, for example, in the bedrooms of small children.

One of the major disadvantages of the prior art vaporizers of this type was that the temperature of the water which remained in the water receptacle at a location exterior of the boiling chamber became very hot after prolonged use. Vaporizers of this type are expected to operate continuously for as long as twelve hours without refilling. It was not unusual for the water temperature of the water exterior of the boiling chamber to approach scalding temperatures after long periods of operation because of the constant application of heat to the unit. Mothers of small children were in constant fear that children would be scalded by accidently overturning the vaporizer.

Furthermore, it was necessary to place some type of an insulating board or other insulating means beneath the high temperature prior art vaporizers to protect furniture and the like.

Attempts have been made to lessen the heat transfer between the boiling chamber and the water reservoir and thus lessen the attained temperature of the water in the reservoir. Duberstein et al., U.S. Pat. 2,763,765, discloses concentric insulating sleeves for this purpose. However, the space between the sleeves is in communication with atmospheric pressures and the water between the sleeves rises to the same level as the water in the water supply chamber. Thus water serves as the insulation medium.

It is the primary object of the present invention to provide an electric steam vaporizer having a novel and improved insulating means between the boiling chamber and reservoir wherein the water exterior of the boiling chamber stays at a relatively low, safe temperature.

It is a further object of the present invention to provide an electrical steam vaporizer which is safe to use in the rooms of small children.

Other objects of this invention will become apparent from the following specification and drawings in which:

FIG. 1 is a vertical sectional view showing one embodiment of an electric steam vaporizer according to the present invention;

FIG. 2 is a vertical sectional view showing a modification of the electrode housing portion of the vaporizer shown in FIG. 1;

FIG. 3 is a fragmentary, horizontal sectional view taken along the line 3—3 of FIG. 1; and FIG. 4 is a top plan view taken along the line 4—4 of FIG. 1 with parts omitted for clarity Briefly, the invention relates to an electric steam vaporizer having a receptacle or reservoir for water to be heated and a pair of vertically disposed electrodes extending into the receptacle. The pair of electrodes constitute a conventional heating element for the vaporizer. An electrode housing extends downwardly into the water receptacle and has a continuous and vertically extending inner wall which defines a boiling chamber into which the electrodes extend. A vertically extending outer skirt is spaced from the inner wall and a top wall extends between the inner wall and the outer skirt. The inner wall, the outer skirt, and the top wall define an air-filled insulating chamber. A cover is removably mounted on the electrode housing and includes a steam discharge port which is in fluid communication with the boiling chamber in the usual manner.

Referring to FIG. 1, a steam vaporizer, according to the present invention, is generally indicated at 10. The vaporizer 10 includes a receptacle 11 which defines a water reservoir chamber 12. In the present embodiment, the receptacle 11 is circular in horizontal cross-section and has an upper cylindrical neck portion 13. An electrode housing 14 depends downwardly into the receptacle 11. The electrode housing 14 has a continuous and vertically extending inner wall 15. In the present embodiment, the inner wall 15 is cylindrically shaped and has an integral bottom 16. The bottom 16 has a water supply opening 17 extending therethrough. The inner wall 15 and the bottom 16 define a cylindrically shaped boiling chamber 18. Of course, the inner wall 15 and the boiling chamber 18 are not restricted to the cylindrical shape shown in this embodiment but may be, for example, rectangularly shaped.

A vertically extending cylindrical outer skirt 20 is horizontally spaced from the inner wall 15 of the electrode housing 14. An impervious, circular top wall 21 extends between the inner wall 15 and the outer skirt 20 of the electrode housing 14. The inner wall 15, the outer skirt 20, and the top wall 21 define an insulating chamber 22 open at the bottom and closed at the top.

The outer skirt 20 of the electrode housing 14 extends upwardly above the circular top wall 21. A integral ring shaped cap 23 having a downwardly turned flange 24 overlies the neck portion 13 of the receptacle 11.

Referring to FIGS. 1 and 4, a cover 31 is removably mounted on the cap 23 of the electrode housing 14 by a plurality of mounting screws 32.

A liquid well 33 is formed in the cover 31 and a steam discharge port 34 is provided in the cover 31 adjacent the well 33.

The electrode structure with which the present invention is used is conventional and includes spaced channel shaped electrodes 42 and 43. The channel shaped electrodes 42 and 43 depend downwardly into the receptacle 11 and serve as a heating element for the boiling chamber 18. The electrodes 42 and 43 are of conductive material and are each fixed to a respective conductor pin 45 at its upper end. The conductor pins 45 are disposed in a plug recess 46 which is formed in the cover 31.

The plug recess 46 is adapted to receive a standard electrical plug (not shown) which is in communication with a power supply, for example, a typical wall outlet. Preferably, one of the mounting screws 32 is positioned beneath and adjacent the plug recess 46 so that it is necessary to disengage the electrical plug before it is possible to remove the cover 31.

During operation of the vaporizer 10 the water receptacle 11 is filled approximately ¾ full until a first water level, generally indicated by the reference number 50 is reached. Next, the electrode housing 14, to which the cover 31 is attached, is placed on the receptacle 11. Because the boiling chamber 18 is in communication with atmospheric pressure through the steam discharge port 34, the liquid enters the boiling chamber 18 through the water supply opening 17 and rises until it reaches the first water level 50. However, a pocket of air is trapped in the insulating chamber 22 and, because there is no communication between the entrapped air and the atmosphere, the water rises upwardly in the insulating chamber only until the air being compressed in the insulating chamber 22 reaches a pressure equal to the water pressure in the water supply chamber. This insulating chamber water level or second water level is generally indicated by the reference number 51.

Ordinary tap water usually contains enough minerals to supply satisfactory operation of the vaporizer 10. However, the degree of electrolytic action may be adjusted. If the mineral content of the tap water is too high, such water may be tempered by adding distilled water. If, on the other hand, the mineral content of the tap water is too low, a small amount of borax or baking soda may be added to thew ater to increase the degree of electrolytic action.

Electric power is supplied to the conductor pins 45 establishing an electrical circuit. The water within the boiling chamber 18 is brought to a boiling temperature within a short period of time. Steam vapor is formed and is discharged through the steam discharge port 34.

A medicament is often placed in the liquid well 33. The medicament vaporizes and, as steam is discharged through the port 34, the steam jet subjects the vapor to an aspirating affect. The steam is conveyed into the room for alleviation of respiratory difficulties.

It has been found that the insulating chamber 22, which contains trapped air, is an excellent insulator. The water located in the water supply chamber 12, exterior of the electrode housing 14, reaches a peak temperature which is well below a scalding temperature.

Another embodiment of the present invention is shown in FIG. 2. In this embodiment, an electrode housing 14a has a circular bottom cap 54. The cap 54 has a circular bottom wall 55 which extends between the lower end of an inner wall 15a of an electrode housing 14a and an outer skirt 20a. In this embodiment, the insulating chamber 22a contains an insulating pocket of air. The bottom cap 55 is adhered or otherwise attached to the inner wall 15a and the outher skirt 20a of the electrode housing 14a.

While the present invention has been disclosed with a specific arrangement and disposition of the parts, it should be expressly understood that numerous modifications and changes may be made without departing from the scope of the appended claims.

What I claim is:

1. An electric steam vaporizer for therapeutic use comprising, in combination, a water receptacle, an electrode housing removably positioned in said receptacle, said electrode housing having an impervious inner wall defining a boiling chamber, an impervious outer skirt spaced from said inner wall, an impervious top wall extending between said inner wall and said outer skirt, said inner wall, said outer skirt and said top wall defining an open bottomed insulating chamber, contiguous with said boiling chamber, capable of retarding heat transfer between the water within said boiling chamber and the water exterior of said insulating chamber, whereby the temperature of the water in said water receptacle exterior of said boiling chamber is maintained at a relatively safe level, a cover on said electrode housing, said cover having a liquid well portion for receiving a medicament and a steam discharge port defined by said cover at a location adjacent said liquid well portion, and a pair of spaced electrodes depending from said cover into said boiling chamber.

2. An electric steam vaporizer for therapeutic use comprising, in combination, a water receptacle, an electrode housing removably positioned in said receptacle, said electrode housing having an impervious inner wall and a bottom wall, said inner wall and said bottom wall defining a boiling chamber, an impervious outer skirt spaced from said inner wall, an impervious top wall extending between said inner wall and said outer skirt, said inner wall, said outer skirt and said top wall defining an open bottomed air-filled insulating chamber, contiguous with said boiling chamber, capable of retarding heat transfer between the water within said boiling chamber and the water in said water receptacle exterior of said insulating chamber, whereby the temperature of the water in said water receptacle exterior of said boiling chamber is maintained at a relatively safe level, said housing defining a water supply opening, a cover removably mounted on said electrode housing, said cover having a liquid well portion for receiving a medicament and a steam discharge port defined by said cover at a location adjacent to and above said liquid well portion, a pair of electrical terminals extending through said cover, and a pair of longitudinally extending electrodes in electrical communication with said terminals, said electrodes extending downwardly, in spaced relationship, into said boiling chamber.

3. An electric steam vaporizer for therapeutic use comprising, in combination, a water receptacle, a housing removably positioned in said receptacle, said housing having an impervious inner wall defining a boiling chamber, an impervious outer wall spaced from and surrounding said inner wall, an impervious top wall extending between said outer wall and said inner wall, said outer wall, said inner wall and said top wall defining an open bottomed insulating chamber, said insulating chamber being effective to retain entrapped air after said housing is positioned within said water receptacle, said insulating chamber being capable of retarding heat transfer between heated water within said boiling chamber and water exterior of said insulating chamber in said receptacle, whereby the temperature of the water in said water receptacle exterior of said boiling chamber is maintained at a relatively safe level, said boiling chamber including a bottom wall attached to said inner wall, said bottom wall defining a water supply opening, whereby such water supply opening serves as a passageway between said receptacle and said boiling chamber, a cover on said housing, said cover defining a steam discharge port, said steam discharge port being in communication with said boiling chamber, and electrical heating means positioned within said boiling chamber.

References Cited

UNITED STATES PATENTS

| | | | |
|---|---|---|---|
| 1,430,548 | 10/1922 | Hogue | 219—273 |
| 1,470,834 | 10/1923 | Hasselbach | 219—314 |
| 1,749,969 | 3/1930 | Brodin | 219—314 X |
| 2,023,324 | 12/1935 | Johnson et al. | |
| 2,076,709 | 4/1937 | Deutsch | 219—275 |
| 2,576,603 | 11/1951 | Hines et al. | 219—314 |
| 2,777,935 | 1/1957 | Schmitt et al. | 219—288 X |

ANTHONY BARTIS, Primary Examiner

U.S. Cl. X.R.

21—119; 128—192; 219—284, 314